Aug. 27, 1957  W. I. STAAF  2,803,945
GAS TURBINE CONSTRUCTION
Filed May 4, 1954  2 Sheets-Sheet 1

INVENTOR.
WERNER I. STAAF
BY
Christy Parmelee & Strickland

Aug. 27, 1957 — W. I. STAAF — 2,803,945
GAS TURBINE CONSTRUCTION

Filed May 4, 1954 — 2 Sheets-Sheet 2

INVENTOR.
WERNER I. STAAF
BY
Christy Parmelee & Strickland

2,803,945

GAS TURBINE CONSTRUCTION

Werner I. Staaf, Carnegie, Pa.

Application May 4, 1954, Serial No. 427,530

9 Claims. (Cl. 60—39.36)

This invention relates to gas turbines of the turbo-jet type and, more specifically, to a new and novel method for cooling the turbine blades exposed to the extreme temperatures of gases from the combustion chamber.

The principal objective is to provide a novel form of turbine wheel wherein compressed air for the combustion chamber is forced through the hollow blades of the wheel in an axial direction to cool same and the air is thereby preheated for the combustion chamber.

Another object of my invention is to change the axial flow of the cooling air to a radial flow on the power side of the turbine.

These and other objects of my invention will be made apparent as the description proceeds.

Figure 1:
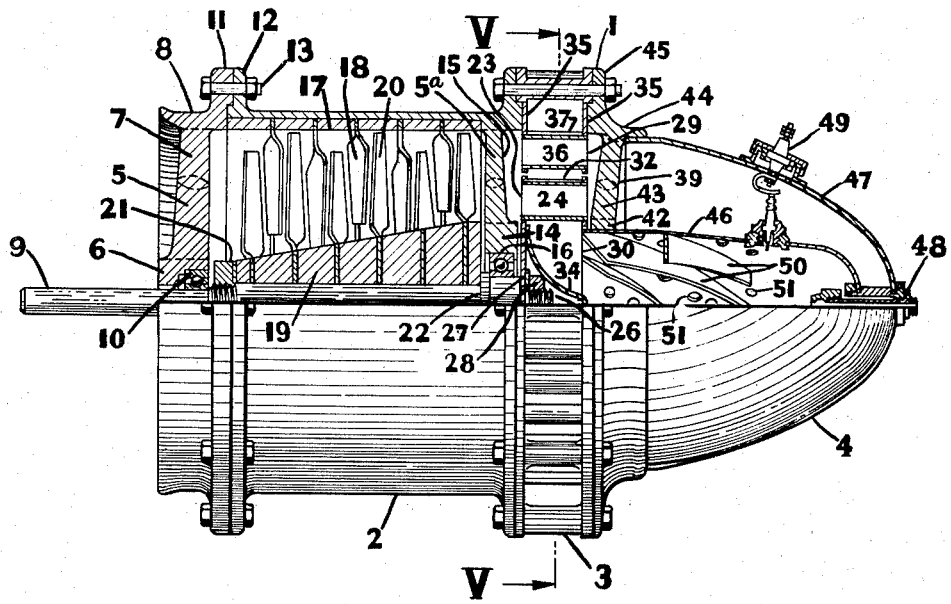
Fig. 1 shows a side elevation, partly in section, of the turbine.
Figure 2:
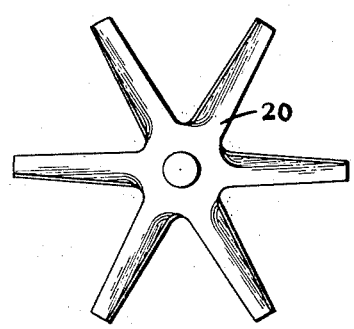
Figs. 2 and 3 show elevations of the movable and fixed air compressor blades.
Figure 3:
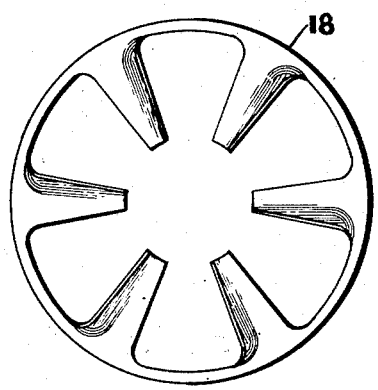
Figure 4:
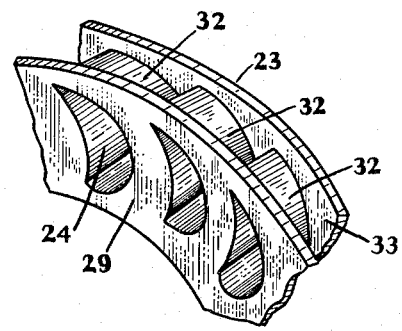
Fig. 4 shows an enlarged perspective view of a portion of the turbine wheel.
Figure 5:
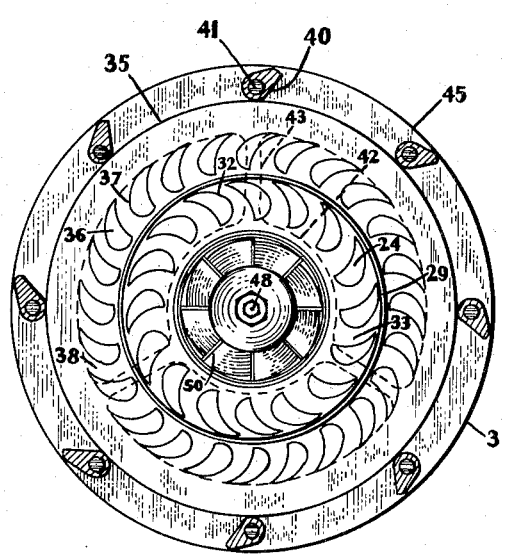
Fig. 5 shows a cross section through the turbine wheel blades and fixed blades of the stator taken on lines V—V of Fig. 1.

Gas turbines of the type herein disclosed normally are of relatively low efficiency due to the relatively large heat loss through the exhaust outlet and show rapid deterioration in the turbine wheel and stator thereof by reason of the high temperatures induced therein by the combustion gases. In the present invention effective cooling of the turbine wheel and stator blades is obtained by first passing the compressed air for the combustion chamber through suitable openings in the blades before the air enters the combustion chamber. In this manner the combustion air becoming preheated, expands and increases the initial compression in the combustion chamber. To accelerate the cooling effect of the combustion air on the turbine blades, the turbine wheel and stator are hollow so that the combustion gases driving the turbine flow over the outside of the blades while cooling air flows unimpeded through the blades.

Referring now in detail to the drawings, reference character 1 indicates the turbine which is comprised of a compressor housing 2, turbine wheel housing 3, and combustion air expansion chamber 4. At the front end of the compressor housing is a spider 5 comprising a hub 6, spaced arms 7 extending outwardly from the hub, a peripheral flange 8 connecting the outer ends of the arms 7. The hub 6 has a suitable opening therein to receive a shaft 9 and is suitably counterbored to receive the bearing 10 in which shaft 9 is mounted. The peripheral flange 8 has an angularly extending flange 11 which is secured to a similar flange 12, on compressor housing 2, by a plurality of bolts 13.

The adjacent ends of the compressor and turbine wheel housings are connected by a suitable spider 5a comprised of a hub 14 and radially extending spaced arms 15 connecting the hub 14 with the compressor housing 2. The hub 14 has a suitable opening to receive the drive shaft 9 and such opening is suitably counterbored to receive a shaft supporting bearing 16. The compressor housing 2 is suitably counterbored to receive a sleeve member 17 in which are mounted the spaced fixed compressor vanes 18. The sleeve 17 and vanes 18 are held in place by any suitable means such as flange 8 on spider 7. Shaft 9 within the compressor housing, has mounted thereon a substantially cone shaped hub 19 on which are mounted the moving compressor vanes 20. The hub 19 is held in fixed position on the shaft between nut 21 and shaft portion 22. The vanes 20 rotate with shaft 9 and are disposed between the fixed vanes 18 to pull air through spider 7, compress it and blow the compressed air through the hollow blades of the turbine wheel and stator into the air expansion chamber.

The turbine wheel may be made from any suitable material, but I prefer to fabricate it from metal plates. In the drawings, front plate 23 has a plurality of radially disposed openings 24 adjacent the periphery thereof. A central opening 25 permits this plate to be mounted on an extension 26 of shaft 9 by any suitable means such as washer 27 and nut 28. The rear plate 29 is preferably of the same diameter as front plate 23 and has similar openings 24 registering with the openings 24 of the front plate. A central opening 30 connects the rear plate 29 with the combustion chamber 46. The plates 23 and 29 are disposed in spaced relation and connected by curved hollow plate members 32 forming the blades of the turbine wheel. These blades have a central opening of the same contour as openings 24 in plates 23 and 29 to form passageways for the combustion air to pass from the compressor chamber into the air expansion chamber. These blades 32 also provide, between them, internal passageways 33 for the combustion gases to pass radially through the turbine wheel. A deflector plate 34 deflects the combustion gases into the radial passageways 33 as shown in Fig. 1 of the drawings.

The stator, which is mounted concentrically with the turbine wheel, is of similar construction, but with the blades 37 reversed in direction in accordance with standard practice. The stator front and back plates 35 preferably are of the same diameter and the openings 36 therein curve in a direction opposite to that of the openings 24 in the turbine wheel. The stator blade plates 37 connect the plates 35 to provide passageways 36 transversely thereof for passage of the compressed combustion air and radial passageways 38 between the blades for the combustion gases. The stator is positioned, in fixed relation, between the adjacent compressor chamber spider and the turbine wheel housing spider 39. Suitable spacer blocks 40 space the two spiders and are held in place by suitable bolts 41 passing through registering openings in the spiders and spacing blocks. The turbine wheel housing spider 39 comprises a hub 42, spaced radial arms 43 extending outwardly from the hub and a peripheral flange 44 connecting the arms 43. A suitable bolting flange 45 is formed on the peripheral flange 44 for reception of bolts 41 as hereinbefore discussed. The stator radial passageways 38 may exhaust the combustion gases to the atmosphere or into a suitable exhaust housing.

The combustion chamber 46 is generally of cylindrical shape having one end open and the opposite end closed. The open end may be mounted in the central opening of the hub 42 of turbine wheel housing spider 39 providing a continuous passage for combustion gases to the turbine wheel radial passages 33. Surrounding the combustion chamber is an air expansion chamber 47 having an open end mounted in the turbine wheel housing spider flange 44 and a closed end adjacent the closed end of the combustion chamber. Apertures 51 in the combustion chamber admit air from the air expansion chamber.

Extending through the closed ends of the combustion and air expansion chambers is a fuel spray nozzle 48 and intermediate the ends of the chambers an igniter 49 similarly extends into the combustion chamber. The fuel spray nozzle and igniter may be any one of the many well known forms of construction and form no part of this invention.

Within the combustion chamber 46, adjacent the open end thereof, are curved vanes 50 which impart rotary motion to the combustion gases passing into the turbine wheel. These vanes are disposed about the inner periphery of the combustion chambers and are preferably formed from special heat resistant alloy metals.

When the hereinbefore described turbine is operating, air enters the forward end of the turbine through spider 5 to the compressor chamber where it is compressed and discharged through the openings in spider 5a into the transverse passageways of the turbine wheel and stator blades from which it passes into the air expansion chamber. The air passing through the turbine wheel and stator blades at high velocity cools the blades and in turn is heated so as to freely expand upon passing into the air expansion chamber. Such preheated air then passes into the combustion chamber through the apertures therein, where it mixes with the sprayed fuel being injected through the end of the chamber and is ignited. The combustion gases pass out the open end of the combustion chamber through the turbine wheel on the outside of the blades causing movement thereof, which in turn drives the shaft 9. The heat imparted to the outer face of the turbine blades by the combustion gases is in large part absorbed by the compressed air flowing through the blades so that the use of expensive heat resistant alloys in the construction of the turbine wheel and stator is not required.

The combustion gases leaving the combustion chamber, in an axial direction, have a centrifugal force imposed thereon through impact upon the vanes 50 mounted on the inner periphery of the chamber. The axial direction of the gases is changed into radial as the gases flow over the deflector plate 34 mounted in the turbine wheel.

The details of construction described and shown herein are for purposes of illustration and not limitation, except as made necessary by the scope of the appended claims.

I claim:

1. In a turbine in combination, an air compression chamber, a turbine wheel chamber, an air expansion chamber and a combustion chamber concentrically mounted within the air expansion chamber, a stator and turbine wheel concentrically mounted in the wheel chamber, registering openings in opposite sides of the turbine wheel and stator connecting the air compression and air expansion chambers, a plurality of apertures in the combustion chamber communicating with the air expansion chamber, hollow means connecting the registering openings in the turbine wheel and stator to define radially disposed passageways in the turbine wheel and stator, and means connecting said radial passageways with the combustion chamber.

2. The turbine of claim 1 in which curved blades extending in a direction longitudinally of the combustion chamber adjacent the turbine wheel impart a centrifugal force to the combustion gases and a deflector plate in the turbine wheel deflects these gases into the radial passageways of the turbine wheel.

3. In a gas turbine, the combination of a turbine wheel concentrically mounted within a stator, each of which comprises spaced plate members connected by hollow arcuate tubes which define transverse passages for combustion air and radial passages for combustion gases passing between the spaced plates of the turbine wheel and stator, and an opening in one plate of the turbine wheel providing for admission of combustion gases to the radial passageways therein.

4. In a gas turbine, in combination, a drive shaft, a turbine wheel front plate mounted on the shaft for rotation therewith and having a rear plate disposed in spaced relation thereto, radially arranged registering apertures in the turbine wheel plates adjacent the periphery thereof, hollow blades connecting the plates and registering with the apertures therein, housings spiders disposed on opposite sides of the plates, each spider comprising a hub portion and at least two radially disposed arms extending outwardly from the hub, a peripheral flange connecting the spider arms of each hub, a plurality of spacer members disposed between the spider peripheral flanges adjacent the periphery thereof and bolts connecting the spider flanges and spacer members, a stator arranged concentrically about the turbine wheel and between said spider flanges in fixed relation thereto, said stator comprising spaced front and back plates having registering openings arranged radially adjacent the inner periphery of the plates and hollow blades connecting such plates and registering with the openings.

5. In a gas turbine in combination, axially aligned air compression, turbine wheel and combustion chambers, an air expansion chamber concentrically arranged about the combustion chamber, apertures in the combustion chamber communicating with the air expansion chamber, a hollow turbine wheel and stator concentrically arranged within the wheel chamber, hollow blades within the wheel and stator providing passageways for axial movement of air from the compression chamber through the blades into the air expansion chamber, and a central opening in one side of the rotor communicating with the combustion chamber for admission of combustion gases for radial movement over the said hollow blades of the wheel and stator.

6. The gas turbine as in claim 5 in which combustion gases driving the wheel have imparted thereto a centrifugas force by vanes in the combustion chamber.

7. The gas turbine as in claim 5 having a deflector plate mounted within the wheel in axial alignment with the combustion chamber converting axial flow of combustion gases from the combustion chamber to radial flow through the wheel and stator.

8. The gas turbine as defined in claim 5 having a radial opening between the air compression chamber and the wheel chamber axially aligned with the passageways through the wheel and stator conveying air to the expansion chamber.

9. In a gas turbine, a turbine wheel comprising spaced side walls joined by radially arranged hollow blades disposed adjacent the periphery of the side walls defining between them passageways through the wheel for combustion gases, apertures in the side walls registering with the openings of the hollow blades providing passageways for combustion air, means providing a combustion chamber, a central aperture in one wheel side wall for admission of combustion gases, a stator arranged concentrically about the wheel and comprising spaced side walls connected by radially arranged hollow blades reversed to the blades of the wheel for defining passageways for exhausting combustion gases moving from the wheel through the stator, apertures in the stator side walls registering with the openings in the hollow blades thereof for passage of combustion air to said combustion chamber.

References Cited in the file of this patent

UNITED STATES PATENTS

| | | |
|---|---|---|
| 2,471,892 | Price | May 31, 1949 |
| 2,477,683 | Birmann | Aug. 2, 1949 |
| 2,553,867 | Parducci | May 22, 1951 |
| 2,611,241 | Schulz | Sept. 23, 1952 |
| 2,625,013 | Howard et al. | Jan. 13, 1953 |